「US012207239B2」

(12) United States Patent
Huang et al.

(10) Patent No.: US 12,207,239 B2
(45) Date of Patent: Jan. 21, 2025

(54) UPLINK SIGNAL TIME DIFFERENCE ADJUSTMENT SYSTEM AND METHOD

(71) Applicant: Industrial Technology Research Institute, Hsinchu (TW)

(72) Inventors: Jen-Feng Huang, Kaohsiung (TW); You-En Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 375 days.

(21) Appl. No.: 17/580,670

(22) Filed: Jan. 21, 2022

(65) Prior Publication Data
US 2023/0164748 A1     May 25, 2023

(30) Foreign Application Priority Data
Nov. 23, 2021    (TW) ................... 110143479

(51) Int. Cl.
*H04W 72/04* (2023.01)
*H04W 56/00* (2009.01)
*H04W 72/0446* (2023.01)

(52) U.S. Cl.
CPC ... *H04W 72/0446* (2013.01); *H04W 56/0065* (2013.01)

(58) Field of Classification Search
CPC ........ H04W 56/0065; H04W 72/0446; H04W 56/0045
See application file for complete search history.

(56) References Cited

U.S. PATENT DOCUMENTS

| | | |
|---|---|---|
| 9,204,411 B2 | 12/2015 | Chen et al. |
| 9,749,927 B2 | 8/2017 | Lohr et al. |
| 10,123,288 B2 | 11/2018 | Dinan |
| 10,136,367 B2 | 11/2018 | Zhang et al. |
| 10,219,230 B2 | 2/2019 | Fwu et al. |
| 10,383,110 B2 | 8/2019 | Blankenship et al. |

(Continued)

FOREIGN PATENT DOCUMENTS

| | | |
|---|---|---|
| CN | 102695267 | 12/2014 |
| CN | 106605434 | 12/2019 |

(Continued)

OTHER PUBLICATIONS

J. Zhou et al., "Estimation and compensation of timing drift for NR-based NTN system," Advances in Communications Satellite Systems. Proceedings of the 37th International Communications Satellite Systems Conference (ICSSC-2019), Oct. 29-Nov. 1, 2019, pp. 1-12.

(Continued)

*Primary Examiner* — Harry H Kim
*Assistant Examiner* — Won Jun Choi
(74) *Attorney, Agent, or Firm* — JCIPRNET (57) ABSTRACT

Provided is an uplink signal time difference adjustment method, adapted to a base station and including the following steps. Each first delay time of arrival of each uplink signal is detected based on a time slot boundary. Each second delay time of each uplink signal is adjusted according to multiple sampling points. Each time offset between each first delay time and each second delay time corresponding to each user apparatus is calculated. The time slot boundary is adjusted according to each time offset.

10 Claims, 9 Drawing Sheets

(56) References Cited

U.S. PATENT DOCUMENTS

| | | | |
|---|---|---|---|
| 10,644,853 | B2 | 5/2020 | Xu et al. |
| 10,856,257 | B2 | 12/2020 | Lee et al. |
| 2014/0308956 | A1 | 10/2014 | Zhang et al. |
| 2014/0369322 | A1 | 12/2014 | Fwu et al. |
| 2016/0242133 | A1 | 8/2016 | Venkob et al. |
| 2016/0302113 | A1* | 10/2016 | Hwang ............. H04L 5/0098 |
| 2018/0063804 | A1 | 3/2018 | Venkob et al. |
| 2018/0084546 | A1* | 3/2018 | Guo ............. H04W 56/0045 |
| 2019/0208387 | A1* | 7/2019 | Jiang ............. H04W 4/46 |
| 2020/0413400 | A1 | 12/2020 | Liu et al. |
| 2021/0281520 | A1* | 9/2021 | Shrestha ............. H04L 47/283 |
| 2021/0297149 | A1* | 9/2021 | Hsieh ............. H04W 56/005 |

FOREIGN PATENT DOCUMENTS

| | | | |
|---|---|---|---|
| CN | 113498014 | 10/2021 | |
| EP | 2557867 A1 * | 2/2013 | ............. H04B 3/36 |
| EP | 2756719 | 1/2020 | |
| TW | I459847 | 11/2014 | |
| TW | 201536008 | 9/2015 | |
| TW | I679869 | 12/2019 | |

OTHER PUBLICATIONS

S. V. Ramanan et al., "On the Dependence Between User Detection and Timing Advancement in LTE Ranging Channels," in IEEE Communications Letters, vol. 20, No. 7, Jul. 2016, pp. 1481-1484.

Shah Zeb et al., "Impact of Indoor Multipath Channels on Timing Advance for URLLC in Industrial IoT," 2020 IEEE International Conference on Communications Workshops (ICC Workshops), Jun. 7-11, 2020, pp. 1-6.

F. Schaich et al., "Relaxed synchronization support of universal filtered multi-carrier including autonomous timing advance," 2014 11th International Symposium on Wireless Communications Systems (ISWCS), Aug. 26-29, 2014, pp. 203-208.

S. V. Ramanan et al., "Effective ranging techniques in LTE," 2016 Twenty Second National Conference on Communication (NCC), Mar. 4-6, 2016, pp. 1-6.

Giyoon Park et al., "Implicit Timing Advance for Cellular Uplink Transmission," 2019 International Conference on Information and Communication Technology Convergence (ICTC), Oct. 16-18, 2019, pp. 834-836.

D. Carrillo et al., "A low-cost test platform to estimate the LTE timing advance procedure," 2016 8th IEEE Latin-American Conference on Communications (LATINCOM), Nov. 15-17, 2016, pp. 1-6.

Yukun Zhang et al., "Timing Advance Estimation With Robustness to Frequency Offset in Satellite Mobile Communications," 2020 IEEE/CIC International Conference on Communications in China (ICCC), Aug. 9-11, 2020, pp. 917-922.

"Office Action of Taiwan Counterpart Application", issued on Oct. 11, 2022, p. 1-p. 10.

* cited by examiner

UPLINK SIGNAL TIME DIFFERENCE ADJUSTMENT SYSTEM AND METHOD

CROSS-REFERENCE TO RELATED APPLICATION

This application claims the priority benefit of Taiwanese application no. 110143479, filed on Nov. 23, 2021. The entirety of the above-mentioned patent application is hereby incorporated by reference herein and made a part of this specification.

TECHNICAL FIELD

The technical field relates to an uplink signal time difference adjustment system and method.

BACKGROUND

A timing advance mechanism is stipulated based on 3GPP standards. In the standard timing advance mechanism, a base station detects time difference between the base station and a user, and a control element of a media access control layer (MAC CE) sends the time difference to a user apparatus for adjustments. However, since the time difference sent to the user apparatus for adjustments has limited granularity, high QAM modulation is subject to limitations due to insufficient SINR.

SUMMARY

One of exemplary embodiments provides an uplink signal time difference adjustment system, including a base station and multiple user apparatuses. The base station has a time slot boundary. Each user apparatus is connected to the base station via wireless communication. The base station is used for the following steps. Each first delay time of arrival of each uplink signal is detected based on the time slot boundary. Each second delay time of each uplink signal is adjusted according to multiple sampling points. Each time offset between each first delay time and each second delay time corresponding to each user apparatus is calculated. The time slot boundary is adjusted according to each time offset.

One of exemplary embodiments provides an uplink signal time difference adjustment method, adapted to a base station and including the following steps. Each first delay time of arrival of each uplink signal is detected based on a time slot boundary. Each second delay time of each uplink signal is adjusted according to multiple sampling points. Each time offset between each first delay time and each second delay time corresponding to each user apparatus is calculated. The time slot boundary is adjusted according to each time offset.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure.

Figure 1:
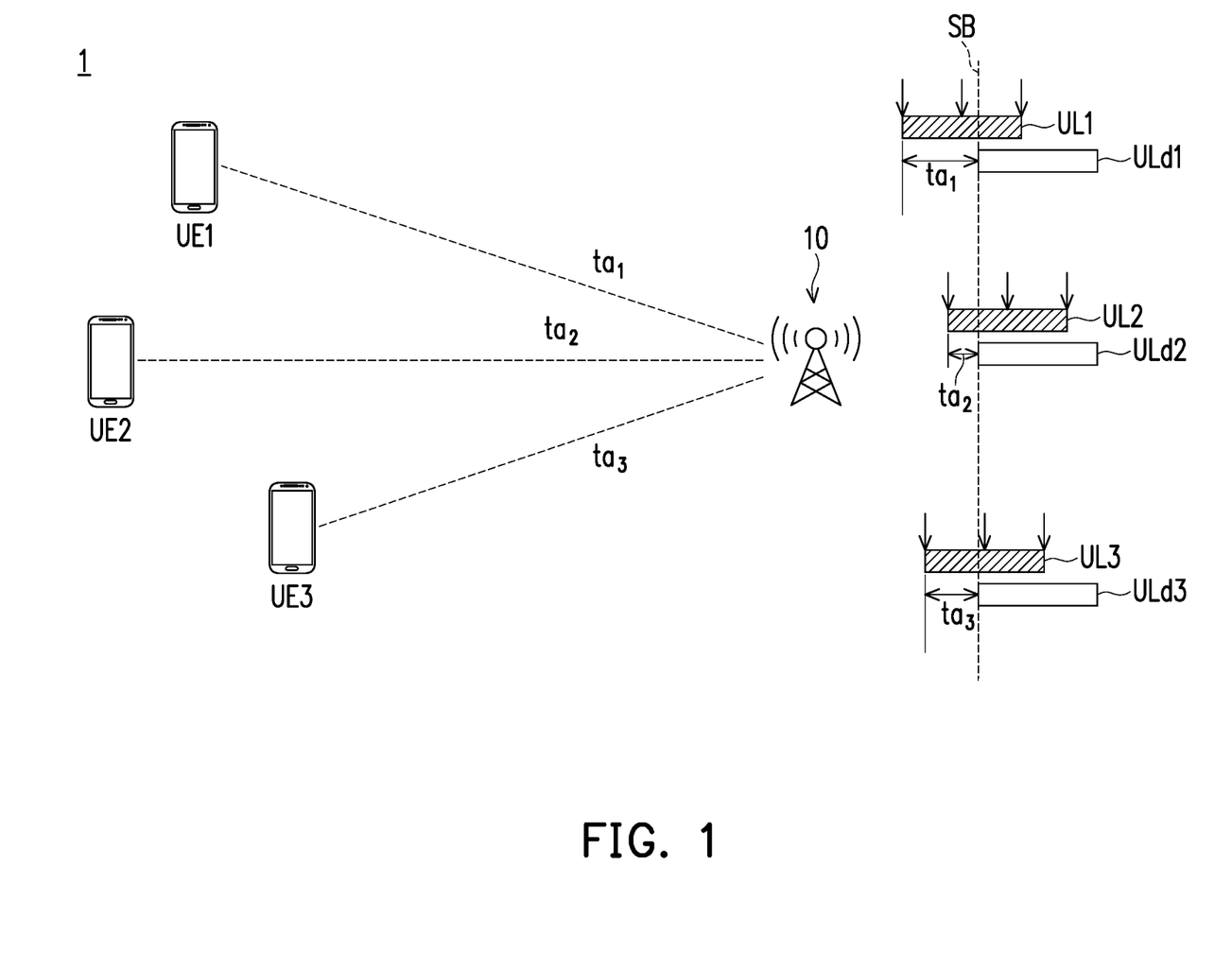
FIG. 1 is a schematic diagram of an uplink signal time difference adjustment system according to an embodiment of the disclosure.

FIG. 1 is a schematic diagram of an uplink signal time difference adjustment system 1 according to an embodiment of the disclosure. With reference to FIG. 1, the uplink signal time difference adjustment system 1 includes a base station 10, a user apparatus UE1, a user apparatus UE2, and a user apparatus UE3, but the number of user apparatuses is not limited thereto. The base station 10 has a time slot boundary SB. Each of the user apparatuses UE1, UE2, and UE3 is connected to the base station 10 via wireless communication. The user apparatuses UE1, UE2, and UE3 are, for example but not limited to, electronic apparatuses that may be connected to a base station via wireless communication such as tablet computers, smart phones, or the like.

The distance between each of the user apparatuses UE1, UE2, UE3 and the base station 10 is different. Therefore, downlink signals received by the user apparatuses UE1, UE2, and UE3 from the base station 10 have different delay times $ta_1$, $ta_2$, and $ta_3$ depending on their respective distances from the base station 10. Similarly, uplink signals UL1, UL2, and UL3 transmitted by the user apparatuses UE1, UE2, and UE3 to the base station 10 have different delay times $ta_1$, $ta_2$, and $ta_3$ depending on their respective distances from the base station 10 while arriving at the base station 10. Among the above, the delay times of the downlink signals are roughly the same as the delay times of the uplink signals.

Uplink signals ULd1, ULd2, and ULd3 shown in FIG. 1 refer to the uplink signals UL1, UL2, and UL3 of which arrival at the base station 10 is delayed. The base station 10 respectively detects the uplink signals UL1, UL2, and UL3 with a physical layer. With the time slot boundary SB as the benchmark, according to FIG. 1, the uplink signal ULd1 is delayed by the first delay time $ta_1$, the uplink signal ULd2 is delayed by the first delay time $ta_2$, and the uplink signal ULd3 is delayed by the first delay time $ta_3$.

Figure 2:
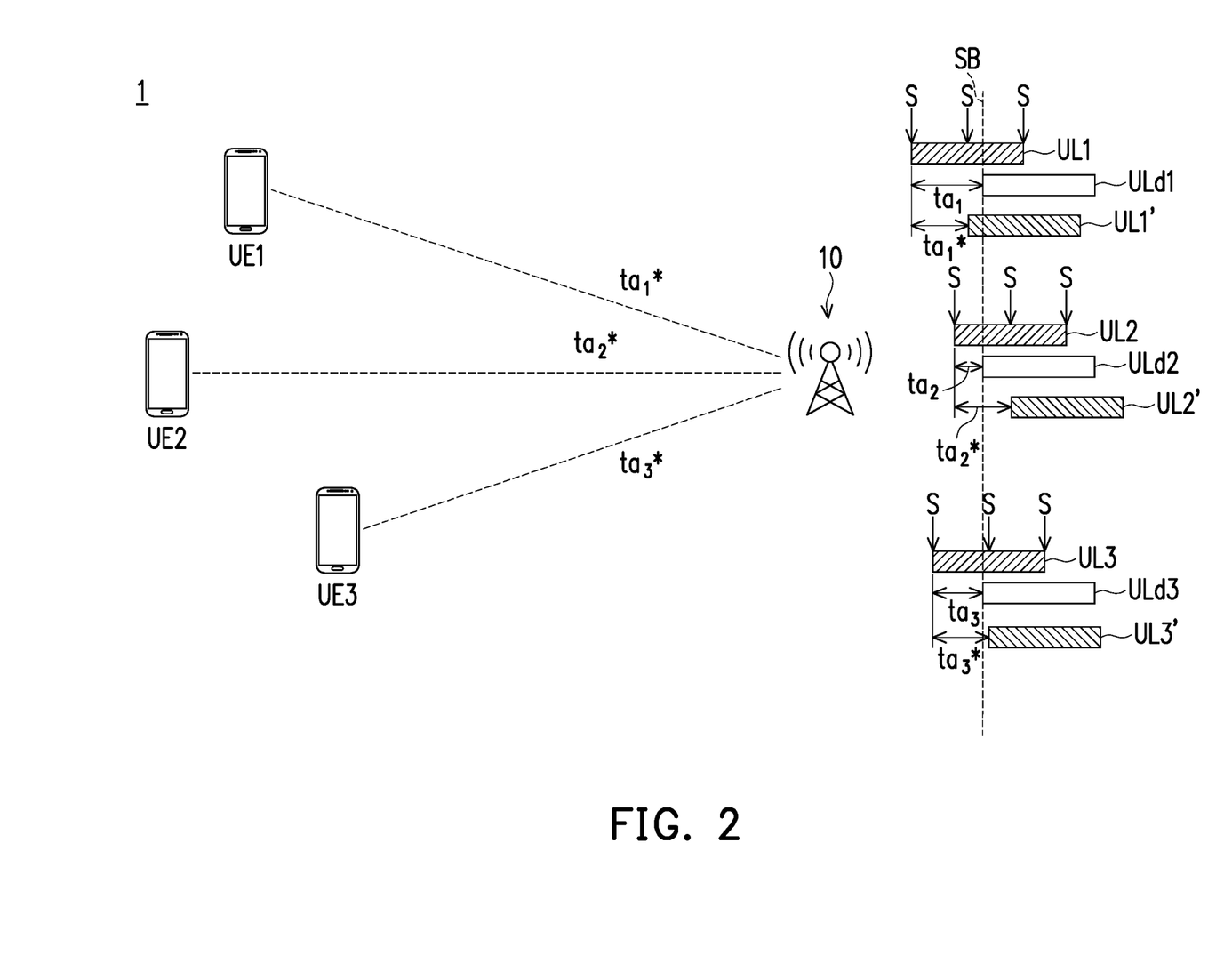
FIG. 2 is a schematic diagram of an uplink signal time difference adjustment system according to an embodiment of the disclosure.

FIG. 2 is a schematic diagram of the uplink signal time difference adjustment system 1 according to an embodiment of the disclosure. As shown in FIG. 2, the base station 10 includes a media access control layer. Due to the limited resolution of the media access control layer of the base station 10, the physical layer of the base station 10 extracts the uplink signals ULd1, ULd2, and ULd3 merely at multiple fixed sampling points S, and the sampling points S are related to the resolution of a control element of the media access control layer. For example, assuming that the resolution of the media access control layer of the base station 10 is 6 bits, then there are 31 sampling points on each divided half with the time slot boundary SB as a center. Therefore, the base station 10 adjusts arrival times of the uplink signals ULd1, ULd2, and ULd3 by the control element of the media access control layer. Taking the uplink signal ULd1 as an example, the base station 10 transmits the adjustment of the uplink signal ULd1 required by the control element to the user apparatus UE1 through a downlink signal (not illustrated). Next, the user apparatus UE1 adjusts the time of transmitting an uplink signal according to the downlink signal and transmits an uplink signal UL1' to the base station 10. Similarly, the base station 10 also adjusts the uplink signals ULd2 and ULd3, and the user apparatuses UE2 and UE3 transmit uplink signals UL2' and UL3' to the base station 10. According to FIG. 2, with the time slot boundary SB as the benchmark, the uplink signal UL1' is delayed by a second delay time $ta_1^*$, the uplink signal UL2' is delayed by a second delay time $ta_2^*$, and the uplink signal UL3' is delayed by a second delay time $ta_3^*$.

Figure 3:
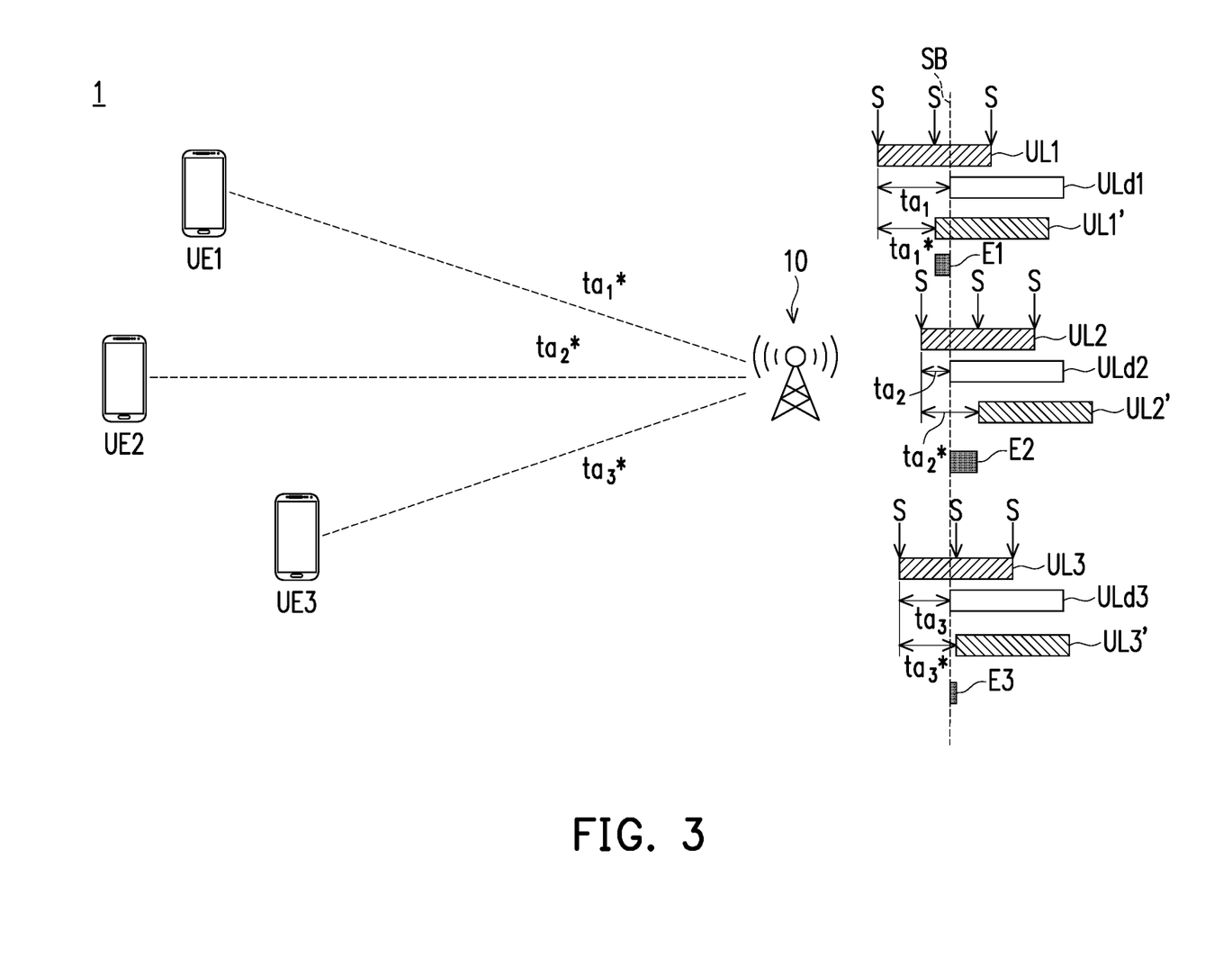
FIG. 3 is a schematic diagram of an uplink signal time difference adjustment system according to an embodiment of the disclosure.

FIG. 3 is a schematic diagram of the uplink signal time difference adjustment system 1 according to an embodiment of the disclosure. As shown in FIG. 3, the base station 10 respectively calculates time offsets E1, E2, and E3 between the first delay times $ta_1$, $ta_2$, $ta_3$ and the second delay times $ta_1^*$, $ta_2^*$, $ta_3^*$ corresponding to the user apparatuses UE1, UE2, and UE3.

Figure 4:
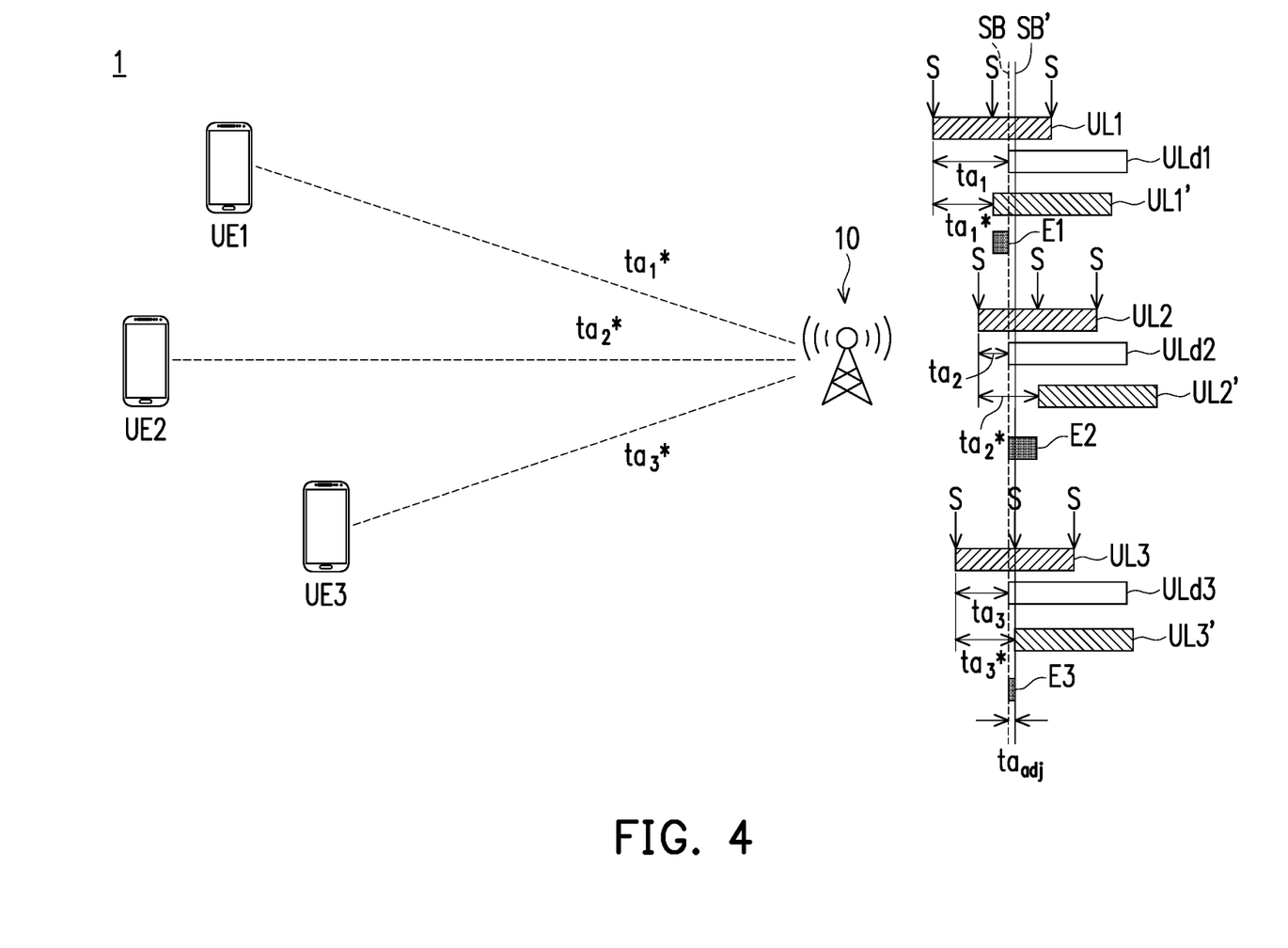
FIG. 4 is a schematic diagram of an uplink signal time difference adjustment system according to an embodiment of the disclosure.

FIG. 4 is a schematic diagram of the uplink signal time difference adjustment system 1 according to an embodiment of the disclosure. As shown in FIG. 4, the base station 10 calculates a time slot boundary adjustment $ta_{adj}$ according to the time offsets E1, E2, and E3, and adjusts the time slot boundary SB to a time slot boundary SB' according to the time slot boundary adjustment $ta_{adj}$. It should be noted that the smaller the time offsets E1, E2, and E3, the closer the times of the uplink signals UL1', UL2', and UL3' arriving at the base station 10 to the sampling points S. On the contrary, the greater the time offsets E1, E2, and E3, the farther the times of the uplink signals UL1', UL2', and UL3' arriving at the base station 10 away from the sampling points S.

In an embodiment, the base station 10 respectively forms an offset vector according to the time offsets E1, E2, . . . , EU corresponding to the user apparatuses UE1, UE2, . . . UEU. For example, the base station 10 forms an offset vector $\overrightarrow{tata^*}$ according to the first delay times $ta_1$, $ta_2$, . . . , $ta_U$ and the second delay times $ta_1^*$, $ta_2^*$, . . . , $ta_U^*$ corresponding to the user apparatuses UE1, UE2, . . . , UEU as shown below:

$$\overrightarrow{tata^*}=(ta_1^*-ta_1, ta_2^*-ta_2, \ldots, ta_{|U|}^*-ta_{|U|})$$

Among the above, U is a total number of user apparatuses.

In addition, the base station 10 also forms a weight matrix w according to weights $w_1$, . . . , $w_{|U|}$ corresponding to the user apparatuses UE1, UEU as shown below:

$$w = \begin{bmatrix} w_1 & \cdots & 0 \\ \vdots & \ddots & \vdots \\ 0 & \cdots & w_{|U|} \end{bmatrix}$$

Among the above, those skilled in the art may set the corresponding weights $w_1$, . . . , $w_{|U|}$, according to the importance of the user apparatuses UE1, UEU. For example, in an uplink signal, if the signaling radio bearer (SRB) requirement is greater than the data radio bearer (DRB), a weight may be set according to SRB/DRB or according to a signal demodulation mode.

After gaining the offset vector $\overrightarrow{tata^*}$ and the weight matrix w, the base station 10 obtains the minimum value according to a product of the offset vector $\overrightarrow{tata^*}$ and the weight matrix w by a vector norm. The vector norm is a method of converting a vector into a scalar. The base station 10 obtains the minimum value (scalar) from the product of the offset vector $\overrightarrow{tata^*}$ and the weight matrix w by the vector norm, such as $\min\|w\cdot\overrightarrow{tata^*}\|_p$. With $\min\|w\cdot\overrightarrow{tata^*}\|_p$ as the time slot boundary adjustment $ta_{adj}$, the time slot boundary SB is adjusted to the time slot boundary SB' according to the time slot boundary adjustment $ta_{adj}$.

Figure 5:
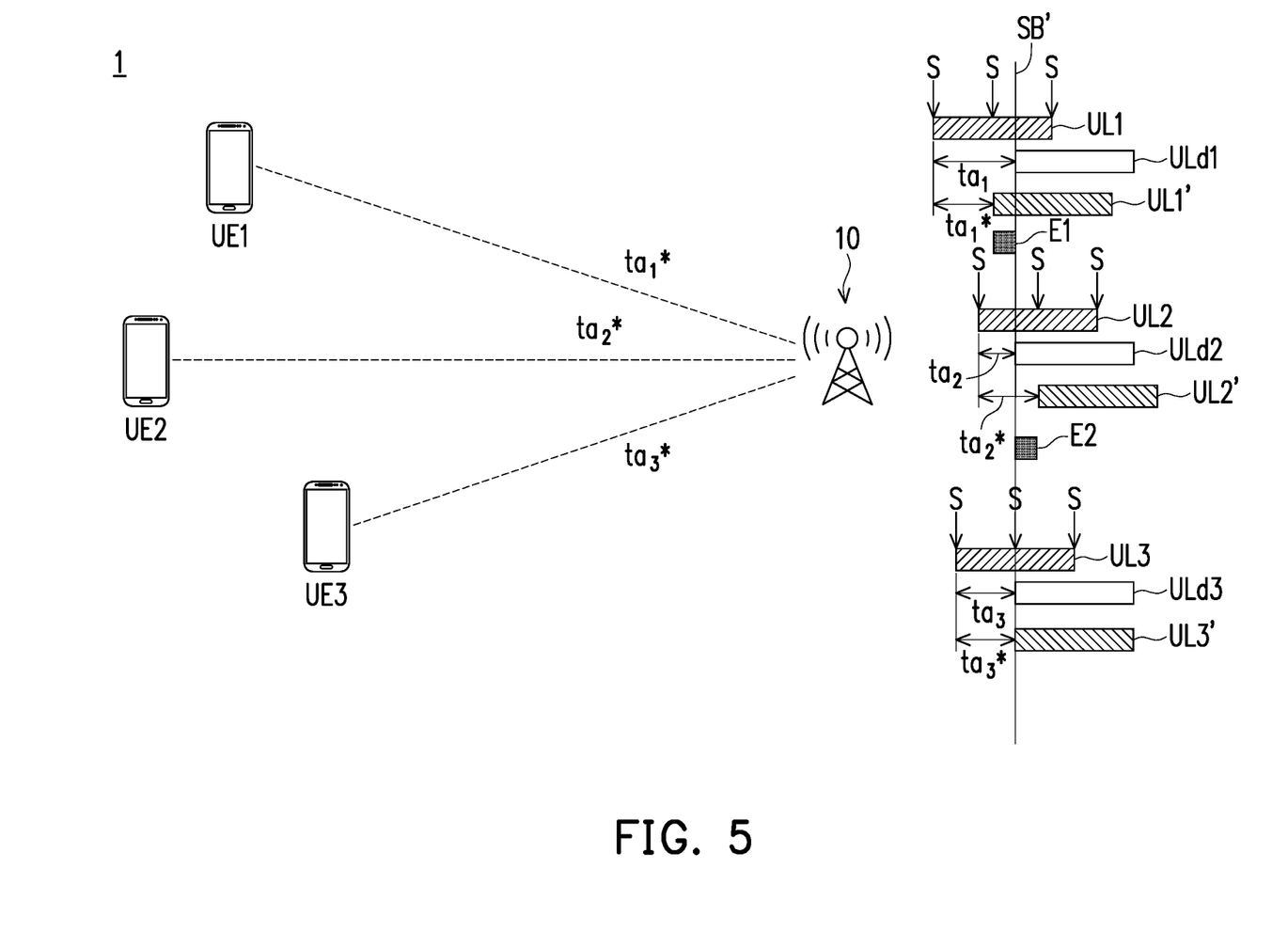
FIG. 5 is a schematic diagram of an uplink signal time difference adjustment system according to an embodiment of the disclosure.

FIG. 5 is a schematic diagram of the uplink signal time difference adjustment system 1 according to an embodiment of the disclosure. As shown in FIG. 5, taking the uplink signal ULd3 as an example, the base station 10 transmits the adjustment of the uplink signal ULd3 required by the control element to the user apparatus UE3 through a downlink signal (not illustrated) according to the sampling points S. Next, the user apparatus UE3 adjusts the time of transmitting the uplink signal UL3' to the base station 10 according to the downlink signal, and the base station 10 detects the second delay time $ta_3^*$ of arrival of the uplink signal UL3'. The base station 10 calculates the time offset E3 between the first delay time $ta_3$ and the second delay time $ta_3^*$ corresponding to the user apparatus UE3. According to FIG. 5, since the time slot boundary SB of the base station 10 has been adjusted to the time slot boundary SB', with the time slot boundary SB' as the benchmark, the time offset E3 between the first delay time $ta_3$ and the second delay time $ta_3^*$ corresponding to the user apparatus UE3 has been eliminated, which means the uplink signal UL3' of the user apparatus UE3 may be extracted by the physical layer of the base station 10 as soon as arriving at the base station 10.

However, since the time slot boundary SB of the base station 10 has been adjusted to the time slot boundary SB', with the time slot boundary SB' as the benchmark, the second delay time $ta_1^*$ of the uplink signal UL1' and the second delay time $ta_2^*$ of the uplink signal UL2' are also be changed, such that the time offsets E1 and E2 between the first delay times $ta_1$, $ta_2$ and the second delay time $ta_1^*$, $ta_2^*$ corresponding to the user apparatuses UE1 and UE2 are changed accordingly. With reference to FIG. 4 and FIG. 5 together, after the time slot boundary SB of the base station 10 is adjusted to the time slot boundary SB', the time offset E2 is also reduced, which means the time of the uplink signal UL2' arriving at the base station 10 is closer to the sampling points S. However, the time offset E1 has increased, which means the time of the uplink signal UL1' arriving at the base station 10 is farther from the sampling points S.

During the communication between the base station 10 and the user apparatuses through the uplink signals and the downlink signals, the base station 10 continues the adjustment according to the uplink signal of each user apparatus. Therefore, the base station keeps adjusting the time slot boundary SB to reduce uplink time deviation of all user apparatuses.

Figure 6A:
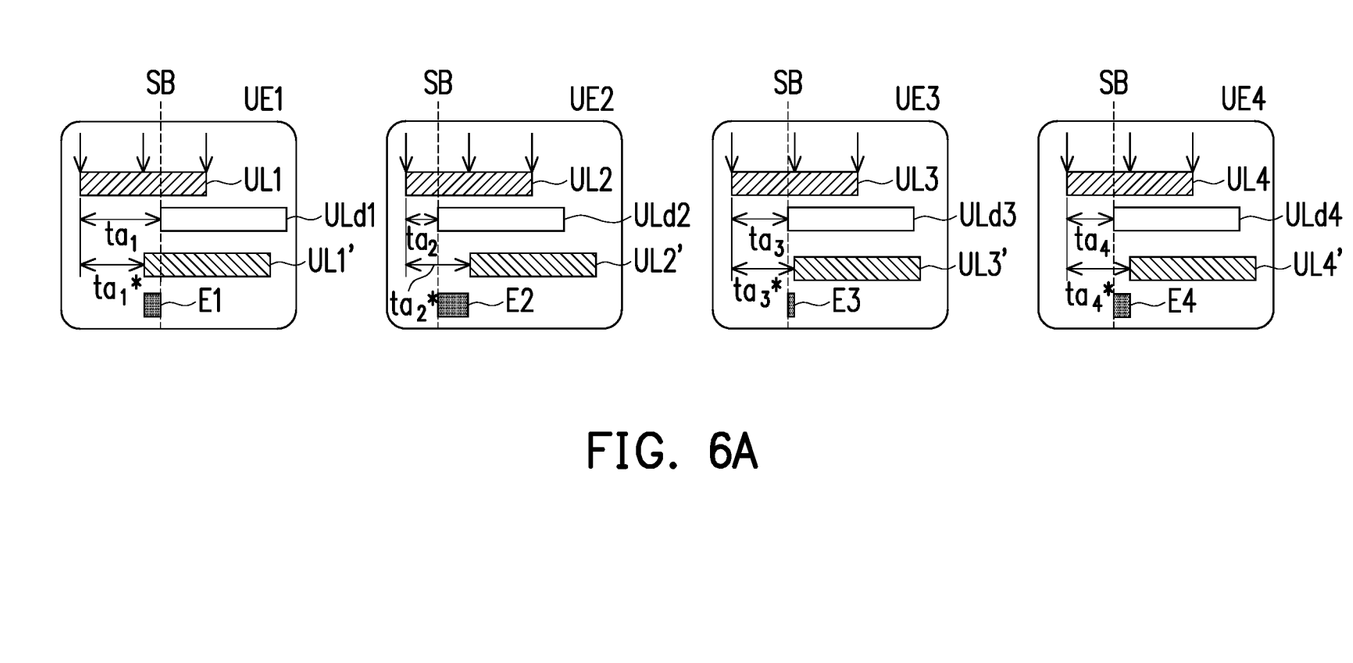
FIG. 6A is a schematic diagram of user apparatuses in an uplink signal time difference adjustment system according to an embodiment of the disclosure.

In an embodiment, without violating QoS principles, the media access control layer of the base station 10 may group the user apparatuses. FIG. 6A is a schematic diagram of user apparatuses in the uplink signal time difference adjustment system 1 according to an embodiment of the disclosure. As shown in FIG. 6A, the base station 10 detects uplink signals UL1, UL2, UL3, and UL4 of user apparatuses UE1, UE2, UE3, and UE4 by the physical layer. According to FIG. 6A, with the time slot boundary SB as the benchmark, the uplink signal ULd1 is delayed by the first delay time $ta_1$, the uplink signal ULd2 is delayed by the first delay time $ta_2$, the uplink signal ULd3 is delayed by the first delay time $ta_3$, and the uplink signal ULd4 is delayed by a first delay time $ta_4$.

The base station 10 adjusts the uplink signals ULd1, ULd2, ULd3, and ULd4, and then the user apparatuses UE1, UE2, UE3, and UE4 transmit the uplink signals UL1', UL2', UL3', UL4' to the base station 10. With the time slot boundary SB as the benchmark, the uplink signal UL1' is delayed by the second delay time $ta_1^*$, the uplink signal UL2' is delayed by the second delay time $ta_2^*$, the uplink signal UL3' is delayed by the second delay time $ta_3^*$, and the uplink signal UL4' is delayed by a second delay time $ta_4^*$. The base station 10 respectively calculates time offsets E1, E2, E3, and E4 between the first delay times $ta_1$, $ta_2$, $ta_3$, $ta_4$ and the second delay time $ta_1^*$, $ta_2^*$, $ta_3^*$, $ta_4^*$ corresponding to the user apparatuses UE1, UE2, UE3, and UE4.

Figure 6B:
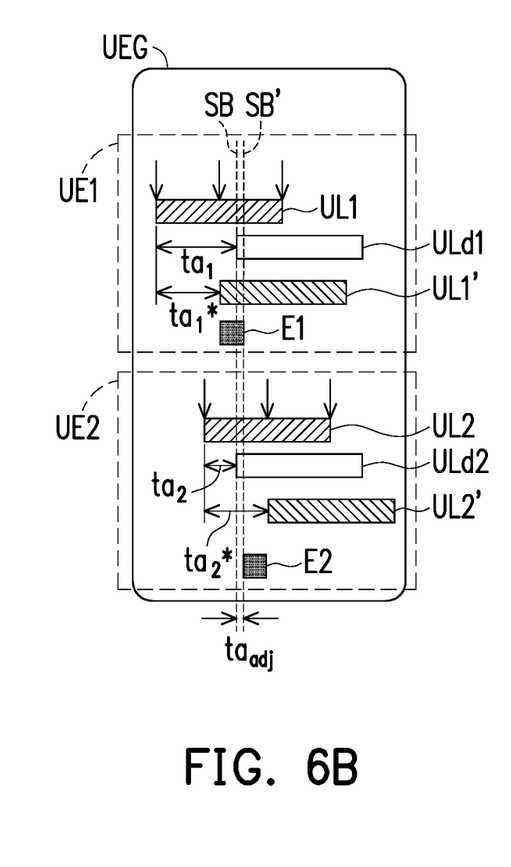
FIG. 6B is a schematic diagram of random grouping of user apparatuses in an uplink signal time difference adjustment system according to an embodiment of the disclosure.

In an embodiment, the media access control layer of the base station 10 may group the user apparatuses UE1, UE2, UE3, and UE4 according to the time offsets E1, E2, E3, and E4. FIG. 6B is a schematic diagram of random grouping of the user apparatuses in the uplink signal time difference adjustment system 1 according to an embodiment of the disclosure. As shown in FIG. 6B, it is assumed that the media access control layer of the base station 10 randomly groups the user apparatus UE1 and the user apparatus UE2 into a user apparatus group UEG. In the user apparatus group UEG, the base station 10 calculates the time slot boundary adjustment $ta_{adj}$ according to the time offset E1 of the user apparatus UE1 and the time offset E2 of the user apparatus UE2, and adjusts the time slot boundary SB to the time slot boundary SB' according to the time slot boundary adjustment $ta_{adj}$.

Furthermore, in the user apparatus group UEG, with the time slot boundary SB' as the benchmark, the second delay time $ta_1^*$ of the uplink signal UL1' and the second delay time $ta_2^*$ of the uplink signal UL2' are changed as well, causing the time offsets E1 and E2 between the first delay time $ta_1$, $ta_2$ and the second delay time $ta_1^*$, $ta_2^*$ corresponding to the user apparatuses UE1 and UE2 to be changed accordingly. With reference to FIG. 6A and FIG. 6B together, in the user apparatus group UEG, after the time slot boundary SB of the base station 10 is adjusted to the time slot boundary SB', the time offset E1 becomes greater than that before grouping, and the time offset E2 becomes smaller than that before grouping. Even if the time slot boundary SB of the base station 10 is adjusted to the time slot boundary SB', this random grouping makes no difference in the distances between the times of the uplink signals UL1', UL2' arriving at the base station 10 and the sampling points S in the user apparatus group UEG, compared to those before grouping.

In view of this, a better grouping method may shorten the sampling period of the physical layer of the base station 10. For example, assuming that the resolution of the media access control layer of the base station 10 is 6 bits, then there are 31 sampling points on each divided half with the time slot boundary SB as a center. The time offsets E1, E2, . . . , EU between the first delay times $ta_1$, $ta_2$, . . . , $ta_U$ and the second delay times $ta_1^*$, $ta_2^*$, . . . , $ta_U^*$ corresponding to the user apparatuses UE1, UE2, UEU are relative to the time slot boundary SB. If the 31 sampling points on one half of the time slot boundary SB is divided into 10 time slots, and user apparatuses having time offsets in the same time slot are grouped into the same user apparatus group, then the time offsets corresponding to the user apparatuses in each user apparatus group are close to each other.

According to FIG. 6A, the time offset E1 corresponding to the user apparatus UE1 is relatively close to the time offset E3 corresponding to the user apparatus UE3, while the time offset E2 corresponding to the user apparatus UE2 is relatively close to the time offset E4 corresponding to the user apparatus UE4. Therefore, the media access control layer of the base station 10 may conduct grouping according to the time offsets of the user apparatuses.

Figure 6C:
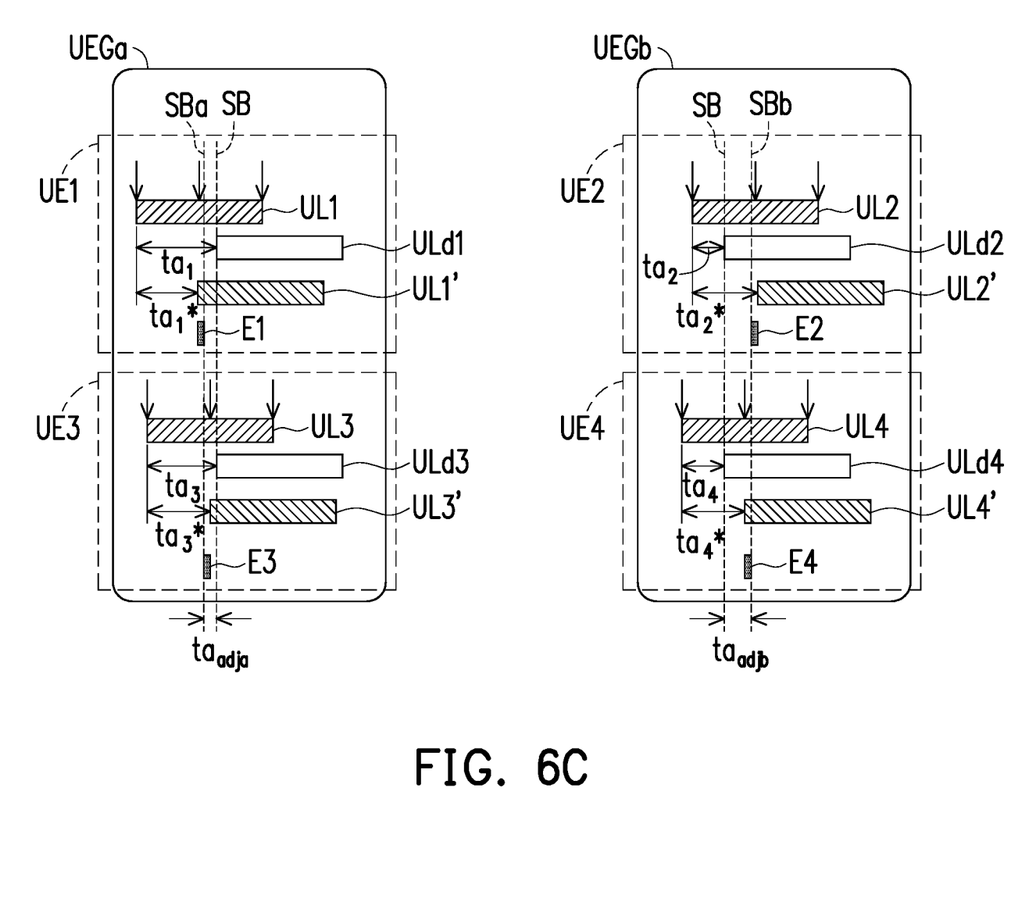
FIG. 6C is a schematic diagram of effective grouping of user apparatuses in an uplink signal time difference adjustment system according to an embodiment of the disclosure.

FIG. 6C is a schematic diagram of effective grouping of user apparatuses in an uplink signal time difference adjustment system according to an embodiment of the disclosure. As shown in FIG. 6C, the media access control layer of the base station 10 groups the user apparatus UE1 and the user apparatus UE3 into a user apparatus group UEGa, and groups the user apparatus UE2 and the user apparatus UE4 into a user apparatus group UEGb.

In the user apparatus group UEGa, the base station 10 calculates a time slot boundary adjustment $ta_{adja}$ according to the time offset E1 of the user apparatus UE1 and the time offset E3 of the user apparatus UE3, and adjusts the time slot boundary SB to a time slot boundary SBa according to the time slot boundary adjustment $ta_{adja}$. In this way, in the user apparatus group UEGa, with the time slot boundary SBa as the benchmark, the second delay time $ta_1^*$ of the uplink signal UL1' and the second delay time $ta_3^*$ of the uplink signal UL3' are also changed, causing the time offsets E1 and E3 between the first delay times $ta_1$, $ta_3$ and the second delay times $ta_1^*$, $ta_3^*$ corresponding to the user apparatuses UE1 and UE3 to be changed accordingly. With reference to FIGS. 6A and 6C together, in the user apparatus group UEGa, after the time slot boundary SB of the base station 10 is adjusted to the time slot boundary SBa, although there is no significant change in the time offset E3, the time offset E1 is significantly reduced. This means in the user apparatus group UEGa, the times of the uplink signals UL1' and UL3' arriving at the base station 10 are close to the sampling points S, which may reduce sampling errors of the physical layer of the base station 10.

Similarly, in the user apparatus group UEGb, the base station 10 calculates a time slot boundary adjustment $ta_{adjb}$ according to the time offset E2 of the user apparatus UE2 and the time offset E4 of the user apparatus UE4, and adjusts the time slot boundary SB to a time slot boundary SBb according to the time slot boundary adjustment $ta_{adjb}$. In this way, in the user apparatus group UEGb, with the time slot boundary SBb as the benchmark, the second delay time $ta_2^*$ of the uplink signal UL2' and the second delay time $ta_4^*$ of the uplink signal UL4' are also changed, causing the time offsets E2 and E4 between the first delay times $ta_2$, $ta_4$ and the second delay times $ta_2^*$, $ta_4^*$ corresponding to the user apparatuses UE2 and UE4 to be changed accordingly. With reference to FIG. 6A and FIG. 6C together, in the user apparatus group UEGb, after the time slot boundary SB of the base station 10 is adjusted to the time slot boundary SBb, both the time offsets E2 and E4 are significantly reduced. This means in the user apparatus group UEGb, the times of the uplink signals UL2' and UL4' arriving at the base station 10 are close to the sampling points S, which may reduce sampling errors of the physical layer of the base station 10.

Figure 7:
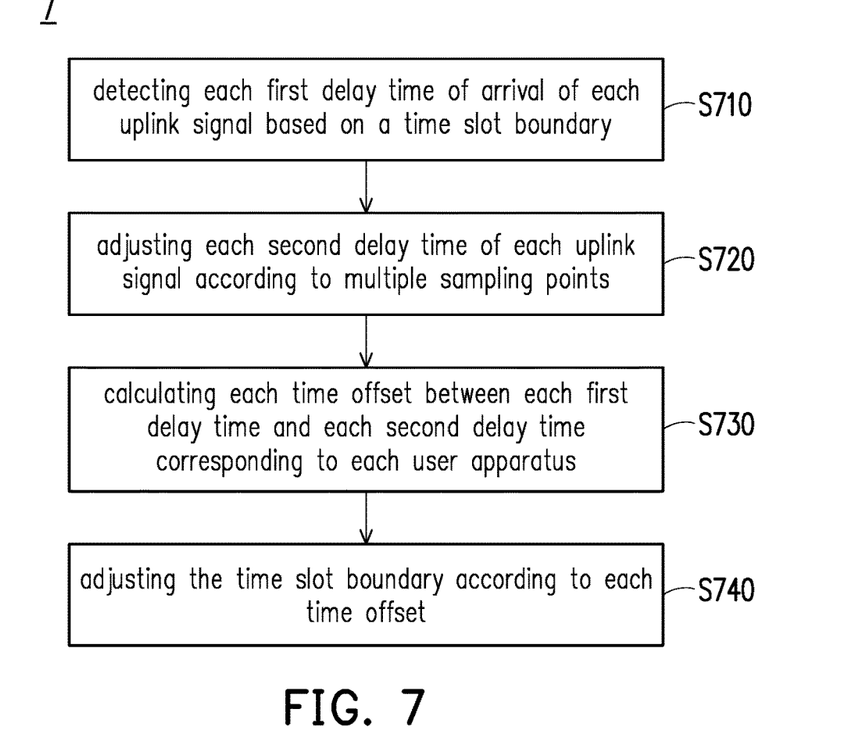
FIG. 7 is a flowchart of an uplink signal time difference adjustment method according to an embodiment of the disclosure.

FIG. 7 is a flowchart of an uplink signal time difference adjustment method 7 shown in an embodiment of the disclosure. As shown in FIG. 7, in step S710, a base station detects each first delay time of arrival of each uplink signal based on a time slot boundary. In step S720, each second delay time of each uplink signal is adjusted according to multiple sampling points. In step S730, each time offset between each first delay time and each second delay time corresponding to each user apparatus is calculated. In step S740, the time slot boundary is adjusted according to each time offset.

In an embodiment, the base station further includes a physical layer and a media access control layer. The sampling points S are related to the resolution of a control element of the media access control layer. The media access control layer notifies the physical layer to adjust the time slot boundary according to each time offset.

Figure 8:
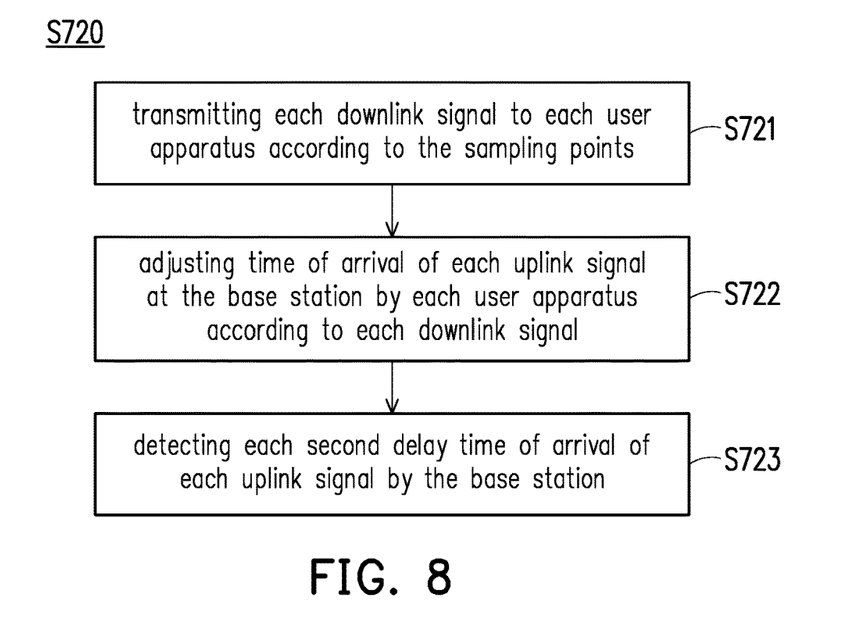
FIG. 8 is a flowchart of adjusting second delay times in the uplink signal time difference adjustment method illustrated in FIG. 7 according to an embodiment of the disclosure.

FIG. 8 is a flowchart of adjusting the second delay times in step S720 in the uplink signal time difference adjustment method illustrated in FIG. 7 according to an embodiment of the disclosure. As shown in FIG. 8, in step S721, each downlink signal is transmitted to each user apparatus according to the sampling points. In step S722, each user apparatus adjusts the time of arrival of each uplink signal at the base station according to each downlink signal. In step S723, the base station detects each second delay time of arrival of each uplink signal.

In an embodiment, the uplink signal time difference adjustment method further includes grouping each user apparatus into multiple user apparatus groups according to each time offset corresponding to each user apparatus. In each user apparatus group, the time slot boundary relative to each user apparatus group is adjusted according to each time offset of each user apparatus in each user apparatus group.

In an embodiment, the uplink signal time difference adjustment method further includes forming an offset vector according to each time offset corresponding to each user apparatus, setting a weight corresponding to each user apparatus to form a weight matrix, obtaining the minimum value from a product of the offset vector and the weight matrix by a vector norm, and adjusting the time slot boundary according to the minimum value.

In summary, the uplink signal time difference adjustment system and method provided in the disclosure may enable the base station to modulate uplink signals without being limited by the resolution of the media access control layer of the base station. The time slot boundary is adjusted according to the difference between the original delay time and the delay time adjusted by the control element of the media access control layer corresponding to each user apparatus, thereby reducing the time difference of the uplink signals between the base station and the user apparatuses and improving the performance of the base station in modulating the uplink signals. In addition, through the timing fine-tuning mechanism of the base station, the granularity problem of the user apparatuses is fixed to improve the SINR of the base station system.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An uplink signal time difference adjustment system, comprising:
   a base station having a time slot boundary; and
   a plurality of user apparatuses, each of the plurality of user apparatuses being connected to the base station via wireless communication, wherein the base station is for:
   detecting each first delay time of each first uplink signal, from each of the plurality of user apparatuses, arriving at the base station based on the time slot boundary;
   transmitting each first downlink signal to each of the plurality of user apparatuses according to a plurality of sampling points, wherein each of the plurality of user apparatuses adjusts an arrival time of each second uplink signal arriving at the base station according to each first downlink signal;
   detecting each second delay time of each second uplink signal, from each of the plurality of user apparatuses, arriving at the base station based on the time slot boundary;
   calculating each time offset between each first delay time and each second delay time corresponding to each of the plurality of user apparatuses; and
   adjusting the time slot boundary according to each time offset.

2. The uplink signal time difference adjustment system according to claim 1, wherein the base station groups each of the plurality of user apparatuses into a plurality of user apparatus groups according to each time offset corresponding to each of the plurality of user apparatuses, wherein
   in each of the plurality of user apparatus groups, the base station adjusts the time slot boundary relative to each of the plurality of user apparatus groups according to each time offset of each of the plurality of user apparatuses in each of the plurality of user apparatus groups.

3. The uplink signal time difference adjustment system according to claim 1, wherein the base station forms an offset vector according to each time offset corresponding to each of the plurality of user apparatuses and sets a weight corresponding to each of the plurality of user apparatuses to form a weight matrix, and the base station obtains a minimum value from a product of the offset vector and the weight matrix by a vector norm and adjusts the time slot boundary according to the minimum value.

4. The uplink signal time difference adjustment system according to claim 1, wherein the base station comprises a media access control layer, and the plurality of sampling points are related to resolution of a control element of the media access control layer.

5. The uplink signal time difference adjustment system according to claim 4, wherein the base station further comprises a physical layer, and the media access control layer notifies the physical layer to adjust the time slot boundary according to each time offset.

6. An uplink signal time difference adjustment method, adapted for a base station and comprising detecting each first delay time of each first uplink signal, from each of a plurality of user apparatuses, arriving at the base station based on a time slot boundary;

transmitting each first downlink signal to each of the plurality of user apparatuses according to a plurality of sampling points, wherein each of the plurality of user apparatuses adjusts an arrival time of each second uplink signal arriving at the base station according to each first downlink signal;

detecting each second delay time of each second uplink signal, from each of the plurality of user apparatuses, arriving at the base station based on the time slot boundary;

calculating each time offset between each first delay time and each second delay time corresponding to each of the plurality of user apparatuses; and adjusting the time slot boundary according to each time offset.

7. The uplink signal time difference adjustment method according to claim 6, further comprising:

grouping each of the plurality of user apparatuses into a plurality of user apparatus groups according to each time offset corresponding to each of the plurality of user apparatuses; and adjusting the time slot boundary relative to each of the plurality of user apparatus groups according to each time offset of each of the plurality of user apparatuses in each of the plurality of user apparatus groups in each of the plurality of user apparatus groups.

8. The uplink signal time difference adjustment method according to claim 6, further comprising:

forming an offset vector according to each time offset corresponding to each of the plurality of user apparatuses;

setting a weight corresponding to each of the plurality of user apparatuses to form a weight matrix;

obtaining a minimum value from a product of the offset vector and the weight matrix by a vector norm; and adjusting the time slot boundary according to the minimum value.

9. The uplink signal time difference adjustment method according to claim 6, wherein the base station comprises a media access control layer, and the plurality of sampling points are related to resolution of a control element of the media access control layer.

10. The uplink signal time difference adjustment method according to claim 9, wherein the base station further comprises a physical layer, and the media access control layer notifies the physical layer to adjust the time slot boundary according to each time offset.

* * * * *